(12) United States Patent
Kao et al.

(10) Patent No.: US 9,256,674 B2
(45) Date of Patent: Feb. 9, 2016

(54) ACTION CLUSTERING FOR NEWS FEEDS

(71) Applicant: Facebook, Inc., Menlo Park, CA (US)

(72) Inventors: Wayne Kao, Mountain View, CA (US);
Daniel Schafer, San Francisco, CA (US); Joshua Van Dyke Watzman, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 99 days.

(21) Appl. No.: 14/162,666

(22) Filed: Jan. 23, 2014

(65) Prior Publication Data

US 2014/0143258 A1 May 22, 2014

Related U.S. Application Data

(63) Continuation of application No. 12/884,010, filed on Sep. 16, 2010, now Pat. No. 8,700,636.

(51) Int. Cl.
*G06F 17/30* (2006.01)
*G06Q 10/00* (2012.01)

(52) U.S. Cl.
CPC ...... *G06F 17/30861* (2013.01); *G06F 17/3089* (2013.01); *G06Q 10/00* (2013.01)

(58) Field of Classification Search
CPC .............. G06F 17/3089; G06F 17/30861
USPC .................. 707/705, 722, 723, 730, 748, 752
See application file for complete search history.

(56) References Cited

U.S. PATENT DOCUMENTS

| | | | |
|---|---|---|---|
| 7,359,915 B1 | 4/2008 | Bush | |
| 8,364,666 B1 * | 1/2013 | Katzir | ............... 707/723 |
| 8,484,224 B1 * | 7/2013 | Harris | ............... G06F 17/30041 707/723 |
| 2004/0103058 A1 * | 5/2004 | Hamilton | ............... G06Q 10/06 705/38 |
| 2006/0042483 A1 | 3/2006 | Work et al. | |
| 2008/0040475 A1 | 2/2008 | Bosworth et al. | |
| 2008/0040673 A1 | 2/2008 | Zuckerberg et al. | |
| 2008/0059897 A1 | 3/2008 | DiLorenzo | |
| 2009/0043789 A1 | 2/2009 | Gupta | |
| 2009/0217178 A1 * | 8/2009 | Niyogi et al. | .................. 715/753 |
| 2010/0057555 A1 | 3/2010 | Butterfield et al. | |
| 2010/0217645 A1 | 8/2010 | Jin et al. | |
| 2010/0228614 A1 | 9/2010 | Zhang et al. | |
| 2010/0281035 A1 * | 11/2010 | Carmel | .................. G06Q 50/01 707/749 |
| 2012/0158501 A1 | 6/2012 | Zhang et al. | |
| 2012/0203831 A1 | 8/2012 | Schoen et al. | |
| 2012/0233009 A1 | 9/2012 | Fougner et al. | |

OTHER PUBLICATIONS

PCT International Search Report and Written Opinion, PCT Application No. PCT/US2011/049076, Apr. 27, 2012, six pages.

* cited by examiner

*Primary Examiner* — Hares Jami
(74) *Attorney, Agent, or Firm* — Fenwick & West LLP

(57) ABSTRACT

One embodiment selects from a plurality of actions performed by one or more users of a social networking system a first action and one or more second actions, wherein each action has one or more attributes; computes a score for each second action by comparing the one or more attributes of each second action with the one or more attributes of the first action; ranks the one or more second actions according to the score computed for each second action; and selects from the one or more second actions one or more highest-ranking second actions as being related to the first action.

19 Claims, 5 Drawing Sheets

|31| Chris Cox, Tom Watson and 4 other friends attended Facebook Places Launch.
Yesterday at 5:00pm at Facebook HQ ╲— 411

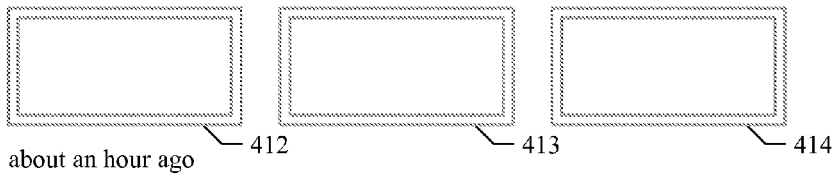

about an hour ago ╲— 412 ╲— 413 ╲— 414

╲— 410

|31| Blaise DiPersia, Rob Goodlatte and 2 other friends are attending Unofficial
Games Hackathon. ╲— 421
September 1 at 9:00pm at Facebook HQ

 Rob Goodlatte can't wait for this. honk dazzle.
40 minutes ago – ☺ 2 – Comment – Like ╲— 422

╱— 423
 Blaise DiPersia Bring it.
45 minutes ago – Comment – Like

╲— 420

 Brandon Walkin, Joey Flynn and 3 other friends are at The Mon's Kettle.
in San Francisco, CA ╲— 431

 Brandon Walkin Pulled pork sandwiches here are the chronic.
10 minutes ago – Comment – Like ╲— 432

╱— 433
 Joey Flynn hangin' with the boys. Our weekly shindig.
11 minutes ago – ☺ 3 – Comment – Like

ACTION CLUSTERING FOR NEWS FEEDS

CROSS-REFERENCE TO RELATED APPLICATIONS

This application is a Continuation application of U.S. Non-Provisional application Ser. No. 12/884,010 filed on Sep. 16, 2010 by Wayne Kao et al., entitled "Action Clustering for News Feeds", which is incorporated by reference herein in its entirety.

TECHNICAL FIELD

The present disclosure generally relates to social-networking systems and more specifically relates to clustering related actions received from users of a social-networking system into action groups.

BACKGROUND

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social networks existing on the Internet in form of social networking systems. Such social networking systems enable their users, who are commonly referred to as website users, to perform various social activities. For example, the social networking system operated by Facebook, Inc. at facebook.com enables its users to communicate with their friends via emails, instant messages, or blog postings, organize social events, share photos, receive news of their friends or interesting events, use social applications, etc.

SUMMARY

The present disclosure generally relates to social-networking systems and more specifically relates to clustering related actions received from users of a social-networking system into action groups.

In particular embodiments, users of a social networking system may perform various types of actions through the social networking system. For example, they may organize social events, share photos, post messages, or check in at specific locations using their mobile devices. The social networking system may receive these individual actions from different users at different times. In particular embodiments, actions that are related to each other may be grouped together into action groups. For example, if there is an event organized through the social networking system and there are photos taken at the event uploaded to the social networking system by multiple users attending the event, the photos and the event may be grouped into the same action group because they are related.

In particular embodiments, the social networking system may provide its users with news feeds concerning various subject matters or topics. In particular embodiments, a group of related actions, which have been grouped into the same action group, may be presented together to a user of the social networking system in the same news feed. For example, a news feed concerning the event organized through the social networking system may include information about the event, such as its time, location, and attendees, and the photos taken at the event, which have been uploaded to the social networking system.

Particular embodiments select from a plurality of actions performed by one or more users of a social networking system, a first action and one or more second actions, wherein each action has one or more attributes; compute a score for each second action by comparing the one or more attributes of each second action with the one or more attributes of the first action; rank the one or more second actions according to the score computed for each second action; and select from the one or more second actions one or more highest-ranking second actions as being related to the first action. Particular embodiments may construct a news feed comprising the first action and the one or more highest-ranking second actions; and present the new feed to a first user of the social networking system.

These and other features, aspects, and advantages of the disclosure are described in more detail below in the detailed description and in conjunction with the following figures.

BRIEF DESCRIPTION OF THE DRAWINGS

FIG. 4 illustrates an example news feed.

DESCRIPTION OF EXAMPLE EMBODIMENTS

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as the one operated by Facebook, Inc. and located at facebook.com, enables its users to perform various types of actions through its web-based interface. For example, a user of a social networking system may search for other users of the social networking system, specify individual users as friends, communicate with friends or other users, post messages, organize social events, share photos, receive news feeds concerning specific topics, use social applications developed by the social network itself as well as by third parties, check in with the social networking system at different geographical locations and different times, and so on. In the context of the present disclosure, an action may be any action or any type of action that users of a social networking system are able to perform at or in connection with the social networking system. In particular embodiments, each time a user performs an action at or in connection with a social networking system, the corresponding system may record the action. Consequently, the social-networking system may record many actions performed by different users of the social networking system at different times.

Particular embodiments may cluster the individual actions that are related to each other into an action group. There may be any number of action groups, where each group contains any number of related actions. The related actions from an action group may be performed by the same user of the social networking system at different times, or by different users of the social networking system at the same or different times. Particular embodiments may then construct news feeds using the action groups, where each news feed includes the related actions from the same action group. When these news feeds are transmitted to the users of the social networking system in the form of news feeds, the related actions from an action group may be presented to a user together in the same news feed.

Figures 1, 2:
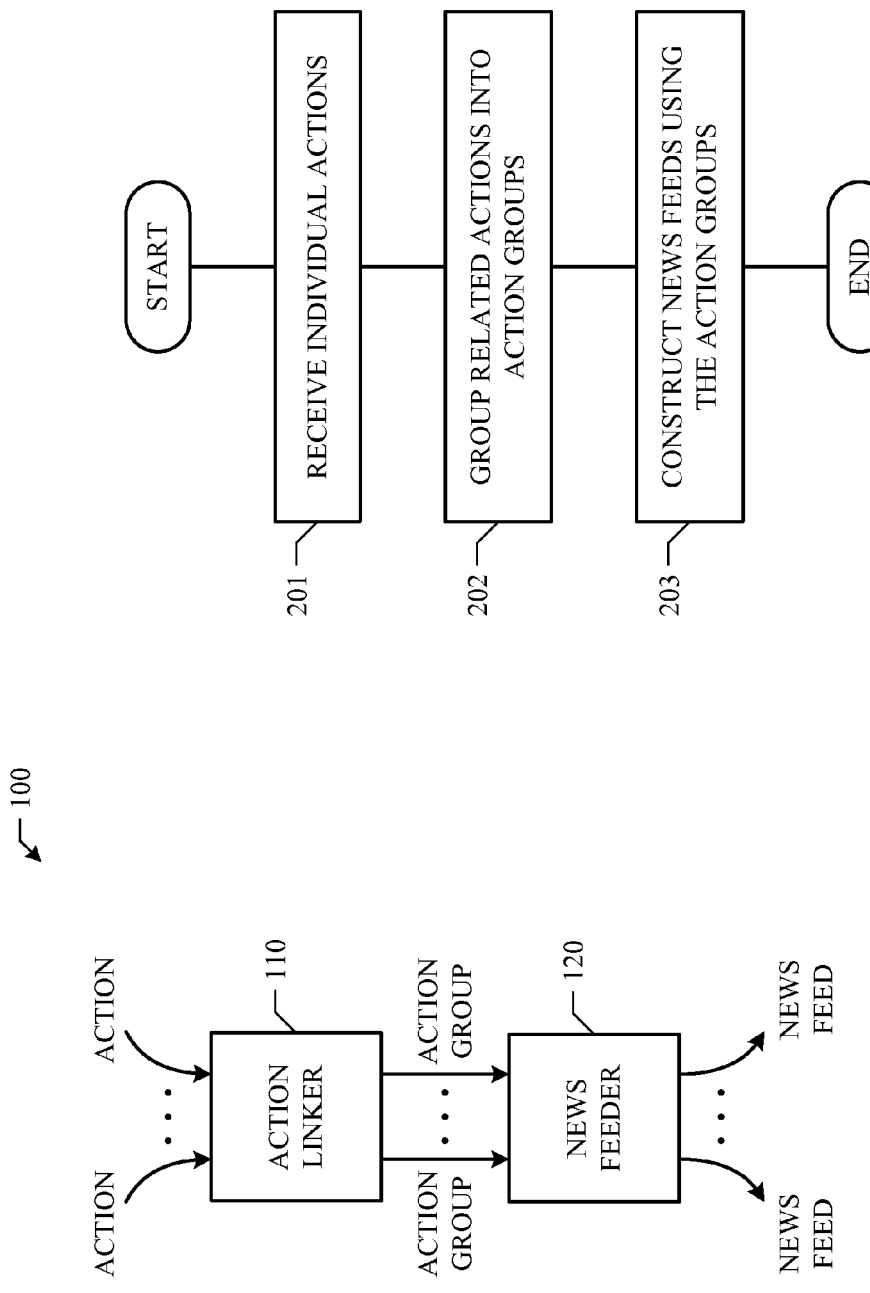
FIG. 1 illustrates an example system for clustering actions for news feeds.
FIG. 2 illustrates an example method for clustering actions for news feeds.

FIG. 1 illustrates an example system 100 for clustering actions for news feeds provided to users. FIG. 2 illustrates an example method for clustering actions for news feeds. FIGS. 1 and 2 are described together. In particular embodiments, system 100 of FIG. 1 may include an action linker 110 and a news feeder 120. In particular embodiments, action linker 110 and news feeder 120 may each include hardware, software, or embedded logic components or a combination of two or more such components for carrying out the appropriate functionalities implemented or supported by action linker 110 and news feeder 120 respectively.

In particular embodiments, action linker 110 may receive individual actions performed by users of a social networking system, as illustrated in step 201 of FIG. 2, and group related actions into separate action groups, as illustrated in step 202 of FIG. 2. In particular embodiments, each action may have any number of associated attributes. The specific attributes each action has may depend on the type of that action. In particular embodiments, action linker 110 may examine and compare the attributes of the individual actions and derive additional information about the individual actions from their associated attributes in order to determine whether some of the actions are related (e.g., whether there is some type of connection between the individual actions). The related actions are then clustered into separate action groups.

More specifically, given a first action and any number of second actions, particular embodiments may determine whether any of the second actions is related to the first action. To do so, particular embodiments may compute a score for each of the second actions based on the attributes of each of the second actions and the attributes of the first action. For each second action, particular embodiments may compare the attributes of the second action with the attributes of the first action, and the score of the second action may be determined based on how well the attributes of the second action match the attributes of the first action. For example, the more attributes of the second action and the first action match, the higher score the second action may have. Particular embodiments may rank the second actions according to their respective scores. Particular embodiments may select one or more highest-ranking second actions as being related to the first action. The highest-ranking second actions and the first action may be grouped together into an action group. In particular embodiments, there may be a predetermined score threshold, such that only those second actions having scores that satisfy the score threshold are selected as being related to the first action. In this case, if no second action has a score satisfying the score threshold, then there may not be any action related to the first action.

In particular embodiments, news feeder 120 may construct news feeds using the action groups determined by action linker 110, as illustrated in step 203 of FIG. 2. In particular embodiments, each news feed may include the related actions from a specific action group. In particular embodiments, the news feeds may be transmitted to the users of the social networking system as news feeds. In particular embodiments, the related actions may be presented to a user of the social networking system together in the same news feed.

There may be many actions performed by the various users of a social networking system each day. Particular embodiments may examine these actions to determine whether some of them are related from time to time, as needed, or on a periodic basis. For example, the process illustrated in FIG. 2 may be performed on an hourly, daily or weekly basis or at some other interval or in response to a particular event or group of events.

In particular embodiments, users of a social networking system are able to perform different types of actions at or in connection with the social networking system. For example, a user may schedule and organize events through the social networking system, establish photo albums and update photos to the social networking system, check in with the social networking system at specific geographical locations, post messages on the social networking system, and so on. In particular embodiments, each type of action may have different types of attributes. For example, an event may have attributes such as title, location, time, organizer, invitee, RSVP (répondez s'il vous plait) response, and so on. A photo album may have attributes such as title, album creation time, photo upload time, number of photos in the album, tags, and so on. A photo may have attributes such as title, shoot time, upload time, location, latitude, longitude, tags, and so on. A check-in may have attributes such as time, location, nearby business, friends identified in connection with the check-in (a form of tag), and so on. A message may have attributes such as title, post time, keyword, privacy control level, recipient name, and so on.

Figure 3:
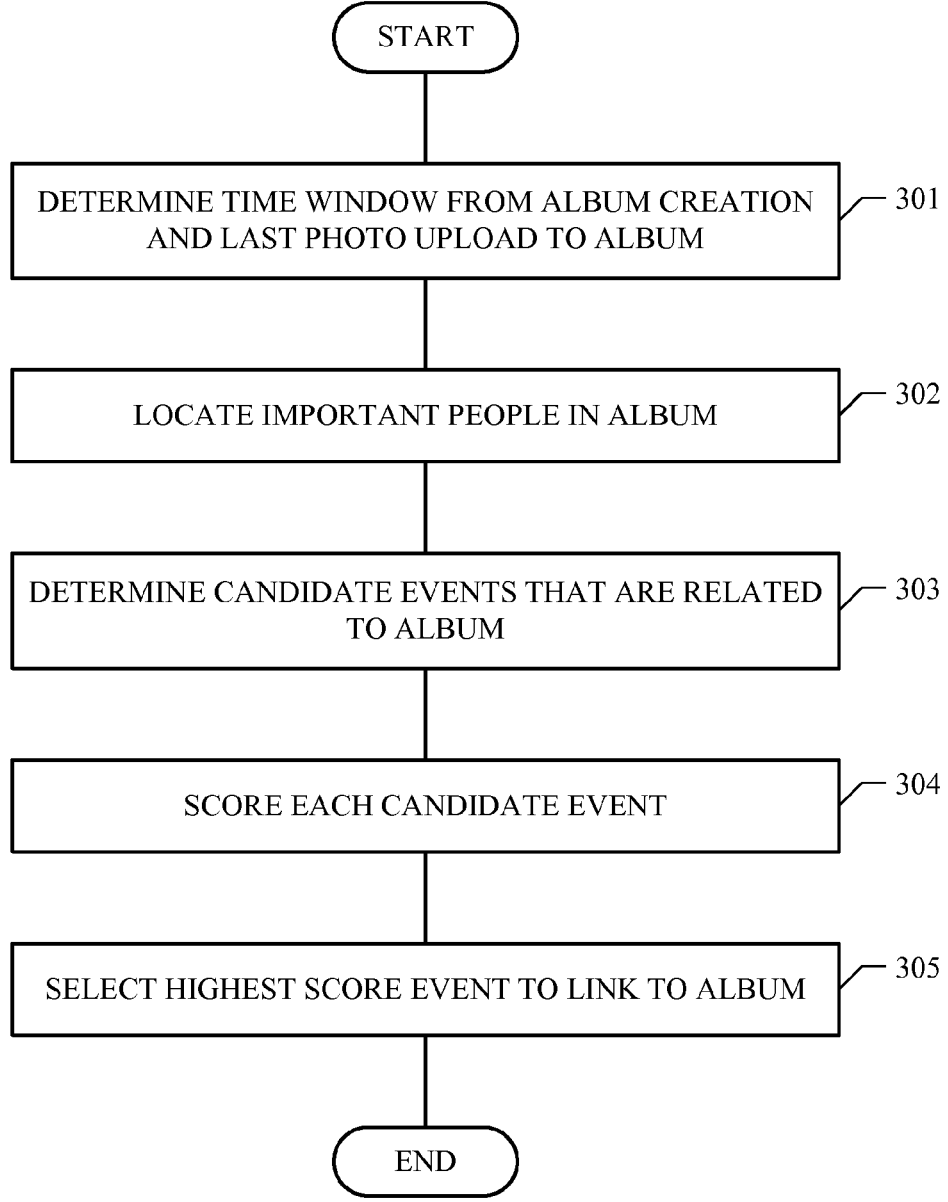
FIG. 3 illustrates an example method for determining events that are related to a photo album.

In particular embodiments, there are different ways to determine whether two actions (e.g., a first action and a second action) are related depending on the specific action types they are and the attributes they have. The present disclosure contemplates any suitable or applicable means to match and determine related actions. For example, FIG. 3 illustrates a method for determining events that are related to a photo album. In the terminology used above, in this example, the photo album may be considered as the first action, and the events may be considered as the second actions.

Often, people participating in a social event may take photos at the event and subsequently share these photos with their families and friends. A social networking system may enable its users to upload photos in order to share them with other users of the social networking system. A social networking system may also enable its users to schedule and organize social events. When users of the social networking system perform these actions (e.g., organize events and upload photos), it may be desirable to determine which photos are related to which event in order to group them together for display in a newsfeed interface.

Suppose a user of the social networking system has created a photo album and uploaded a number of photos to the social networking system and placed the uploaded photos in this photo album. Particular embodiments may determine whether there is an event organized through the social networking system that is related to the photos in the photo album (e.g., the photos in the photo album have been taken at the event) using, for example, the steps illustrated in FIG. 3.

Particular embodiments may determine a time window for the photo album, as illustrated in step 301. In particular embodiments, the time window may be from the time when the album was created to the time when the last photo was uploaded into the album. The different times may be determined from the attributes associated with the photo album and the attributes associated with the individual photos in the album. For example, the time the album was created may be determined using the "album creation time" attribute associated with the photo album. The time the last photo was uploaded into the album may be determined by examining the "photo upload time" attribute associated with each of the photos in the album and selecting the photo with the latest upload time. Suppose an example photo album was created on Jan. 10, 2010 at 10:20 am, and the last photo was uploaded into this album on Jan. 16, 2010 at 20:45 pm. Then the time window for this photo album is from 10:20 am, Jan. 10, 2010 to 20:45 pm, Jan. 16, 2010.

Particular embodiments may locate people associated with the album who are considered important, as illustrated in step 302. In particular embodiments, the important people associated with an album may include the creator or owner of the album and the people who have uploaded photos into the album, if they differ from the creator of the album.

The photos in the album may have associated tags, some of which may include the names of the people in the photos. In particular embodiments, a photo of two friends, Mary Smith and Jane Johnson, may be tagged with the names of these two people. Alternatively, in particular embodiments, a photo of two friends, Mary Smith and Jane Johnson, may be tagged with the actual persons Mary Smith and Jane Johnson (e.g., using their unique user identifiers at the social-networking website). In this case, if there are two users who have the same name (e.g., Mary Smith), since they have different user identifiers, the tag may still distinguish which Mary Smith is actually in the photo. Particular embodiments may examine the tags associated with the album as well as the tags associated with each of the photos in the album to locate people's names in these tags. Suppose Mary Smith and Jane Johnson have attended an event together. It is then likely that they may be in several photos taken at this event, either individually or together with each other or with other people attending the same event. Consequently, their names may be found in the tags associated with multiple photos in the album. Particular embodiments may determine the number of times each name appears in the tags associated with the album and with the photos in the album. In particular embodiments, the important people associated with the album may also include a number of people whose names appear most frequently in the tags associated with the album or with the photos in the album (i.e., the most-frequently tagged people). For example, the top N (e.g., 5) or the top n % (e.g., 10%) most tagged people in the album may be included in the list of important people associated with the album.

Particular embodiments may determine a list of candidate events potentially related to the photo album using the time window and the list of important people associated with the photo album, as illustrated in step 303. To determine the list of candidate events for a photo album, particular embodiments may select all the events organized through the social networking system that occur shortly before (e.g., within one week before the creation time of the album) and during the time window associated with the photo album and are attended by at least one important person associated with the photo album.

In connection with the above examples, suppose Mary Smith is considered an important person associated with the photo album because the number of times her name appears in the tags associated with the photos in the album is above the threshold selected for the important people. Further suppose that Mary Smith has attended four events occurring on Dec. 25, 2009, Jan. 8, 2010, Jan. 13, 2010, and Feb. 3, 2010 respectively. In this case, the two events occurring on Jan. 8, 2010 and Jan. 13, 2010, respectively, may be included in a list of candidate events that is potentially related to the photo album described in the above example, which has a time window from 10:20 am, Jan. 10, 2010 to 20:45 pm, Jan. 16, 2010, as these two events occur shortly before and during the time window associated with the photo album. On the other hand, the two events occurring on Dec. 25, 2009 and Feb. 3, 2010 are not included in the list of candidate events because they occur far outside the time window associated with the photo album. As another example, suppose there is an event occurring on Jan. 15, 2010, which is within the time window associated with the above example photo album. But this event may not be included in the list of candidate events for the example photo album if none of the important people associated with the example photo album has attended this event.

Particular embodiments may determine which person has attended which event by examining the attributes associated with each event. For example, particular embodiments may examine the organizer, the invitees, and the RSVP responses of the event to determine who have attended that event, and then match the names of the event attendees with the names of the important people associated with the photo album.

Particular embodiments may score each candidate event with respect to the photo album based on the attributes associated with the candidate event and the attributes associated with the photo album, as illustrated in step 304. Given a specific candidate event, particular embodiments may assign an initial default score (e.g., 0) to the event, and then adjust (e.g., increase or decrease) the score of the event based on comparisons made between the candidate event and the photo album or between specific attributes associated with the candidate event and attributes associated with the photo album. Many different types of comparisons may be used for adjusting the score of a candidate event, and the present disclosure contemplates any suitable and applicable type of comparison.

In particular embodiments, for each person who is tagged at least once with the photos in the album, if this person has attended the event, then the score of the event may be increased by some value. Conversely, if this person has not attended the event, then the score of the event may be decreased by some value.

In particular embodiments, the title of a candidate event and the title of the photo album may be compared. If the two titles match, then the score of the candidate event may be increased by some value. Conversely, if the two titles do not match, then the score of the candidate event may be decreased by some value. In particular embodiments, when comparing the title of the candidate event with the title of the photo album, it may not be necessary for the two titles to match exactly, word by word. Particular embodiments may ignore words such as "the", "a", "at", "in", "on", etc. and match only the keywords (e.g., nouns or adjectives) found in the two titles, and if there are sufficient number of common keywords found in the two titles, particular embodiments may still consider the two titles match.

For example, suppose the title of a photo album is "new year celebration party 2010". Further suppose that one candidate event for the photo album has a title "new year celebration party 2010", and another candidate event for the photo album has a title "2010 celebration party at Mary's place".

The title of the first candidate event matches exactly the title of the photo album. Thus, the score of the first candidate event may be increased by some value. However, for the second candidate event, there are several keywords (e.g., celebration, party, 2010) common to the title of second candidate event and the title of the photo album that a match may still be found between these two titles. As a result, the score of the second candidate event may also be increased by some value. In particular embodiments, the actual value increased for the score may differ between the two cases. For example, if a candidate event's title matches exactly the title of the photo album, the score of that candidate event may be increased by a relatively large value (e.g., 5). On the other hand, if a candidate event's title does not match exactly the title of the photo album but there is a sufficient number of keywords found in the candidate event's title that match keywords in the title of the photo album, the score of that candidate event may be increased by a relatively small value (e.g., 1).

In particular embodiments, the location of a candidate event and the location of the photos in the photo album may be compared. If the two locations match, then the score of the candidate event may be increased by some value. Conversely, if the two locations do not match, then the score of the candidate event may be decreased by some value. The location of the candidate event may be determined from the attributes (e.g., the "location" attribute) associated with the candidate event. The location of the photos in the photo album may be determined from attributes or tags associated with the photos. For example, a photo may have metadata or tags indicating the geographical location, latitude, or longitude of the place where the photo was taken, which may be used to determine the location of the photo.

In particular embodiments, the time of a candidate event and the time of the album or of the photos in the photo album may be compared. If the two times match, then the score of the candidate event may be increased by some value. Conversely, if the two times do not match, then the score of the candidate event may be decreased by some value. The time of the candidate event may be determined from the attributes (e.g., the "event time" attribute) associated with the candidate event. The time of the photos in the photo album may be determined from attributes or tags associated with the photos. For example, a photo may have metadata or tag indicating the time when the photo was taken, which may be used to determine the time of the photo. If a photo was taken at a time when the candidate event was in progress, then particular embodiments may consider there is a time match between the photo and the candidate event. Conversely, if a photo was taken either before or after the time when the candidate event occurred, then particular embodiments may consider that the photo and the candidate event do not match in time.

In particular embodiments, the RSVP responses of a candidate event may be compared with the people tagged with the photos in the photo album. Often when a person organizes an event, the event organizer may have a list of invitees for the event and send out invitations to these invitees with information about the event. The organizer may request each invitee to respond to the invitation and indicate whether the invitee will attend the event. The responses from the invitees are often referred to as RSVP responses. Typically, an invitee may reply to the invitation in one of three ways: yes (i.e., will attend the event), no (i.e., will not attend the event), and maybe (i.e., uncertain, may or may not attend the event). In addition, it is possible that an invitee may not reply to the invitation and provide any RSVP response.

In particular embodiments, each invitee's RSVP response for the candidate event may be compared with the people tagged with the photos in the photo album, and the score of the candidate event may be adjusted based on the result of the comparisons. For example, if a person tagged with the photos has provided a "yes" RSVP response to the candidate event, then the score of the candidate event may be increased by a relatively large value (e.g., 5). If a person tagged with the photos has provided a "maybe" RSVP response, then the score of the candidate event may be increased by a relatively small value (e.g., 2). If a person tagged with the photos has provided a "no" RSVP response, then the score of the candidate event may be decreased by a relatively large value (e.g., −10).

In particular embodiments, for those invitees of the candidate event who have not provided any RSVP response, each of such invitees may be compared with the people tagged with the photos in the photo album. For example, if a person tagged with the photos is an invitee who has not provided any RSVP response, then the score of the candidate event may be increased by a relatively small value (e.g., 1 or 2).

In particular embodiments, if a person tagged with the photos is not an invitee of the candidate event, then the score of the candidate event may be decreased by some value. A person who is not an invitee of a particular event is unlikely to have attended that event. Therefore, if such a person appears in a photo, it suggests that the photo is not taken at the event in question.

A score is determined for each candidate event of the photo album using any suitable means. In particular embodiments, the scores of the candidate events may be normalized by the sizes of the events (e.g., the score of a particular event may be divided by the number of people attending that event).

Particular embodiments may select the candidate event that has the highest score among all the candidate events to be the event relating to the photo album, as illustrated in step 305. In particular embodiments, there may be a score threshold such that an event that is considered to be related to a photo album should have a score above the score threshold. In this case, if no candidate event has a score above the score threshold, then the photo album may not have any related event.

Once an event has been determined to be related to a photo album, particular embodiments may construct a news feed that includes both the event and the photo album. The news feed may be formatted for display and transmitted to specific users of the social networking system (e.g., users who have attended the event) as news feeds.

A news feed, also referred to as web feed, is a data format typically used for providing network users with frequently updated content. In one implementation, the news feed is formatted using the Activity Streaming protocol. In particular embodiments, a social networking system may provide various news feeds to its users, where each news feed includes content relating to a specific subject matter or topic. Various pieces of content relating to a particular topic may be aggregated into a single news feed. Individual users of the social networking system may subscribe to specific news feeds of their interest.

FIG. 4 illustrates several examples of news feeds, which may be presented to users of a social networking system. For example, news feed 410 relates to an event called "Facebook Places Launch". This even has been determined to be related to a photo album using the process illustrated in FIG. 3. News feed 410 thus includes the information 411 about the event and the photos 412, 413, 414 from the photo album related to the event.

Although FIG. 3 illustrates a process designed to determine an event that is related to a photo album, the similar concept may be apply to link any type of actions performed by the users of a social networking system. For example, messages posted to the social networking system by different users may be linked to particular events by matching the various attributes of the messages (e.g., time, title, keywords, posting user, etc.) with the attributes of the event (e.g., time, title, keywords, attendee, etc.). In FIG. 4, news feed 420 includes information 421 about an event called "Unofficial Games Hackathon" and two messages 422, 423 posted by two users of the social networking system attending the event. Similarly, news feed 430 includes information 431 about an event called "The Mon's Kettle" and two messages 432, 433 posted by two users of the social networking system attending the event.

In addition, the present disclosure may be configured to match check-ins to photos and photo albums. Check-ins include similar attributes to events in that a given check-in record identifies one or more users, a location, a location name and a time. Check-ins may also be associated with comments and other data. One or more attributes of the process illustrated in FIG. 3 can be readily extended to match check-ins to photos.

Social networking system may maintain a database of information relating to places. Places correspond to various physical locations, such as restaurants, bars, train stations, airports and the like. Some places may correspond to larger regions that themselves contain places-such as a restaurant or a gate location in an airport. In one implementation, each place can be maintained as a hub node in a social graph or other data structure maintained by the social networking system, as described in U.S. patent application Ser. No. 12/763,171. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. As described below, a user may select a place from a list of existing places near to the user's current location or create a new place. The user may also provide comments in a text string when checking in to a given place. The user may also identify one or more other users in connection with a check-in (such as friends of a user) and associate them with the check-in as well. U.S. patent application Ser. No. 12/574,614, which is incorporated by reference herein for all purposes, describes a system that allows a first user to check-in other users at a given place. An entry including the comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. For example, social networking system may select the check-in activity associated with the friends or other social contacts of a user that requests a page corresponding to a place. U.S. application Ser. No. 12/858,718, incorporated by reference in its entirety for all purposes, describes an example geo-social networking system that can be used in connection with various embodiments of the present invention.

Similarly, the present disclosure may be configured to match multiple photo albums created by different users of a social-networking website to each other. For example, suppose several users of the social-networking website attended the same event or participated in the same activity. Some of these users may take photos at the event. Subsequently, several users may each create a photo album in connection with their own user accounts at the social-networking website and upload the photos they each took at the event to their respective photo albums. Each photo album may have one or more attributes and tags associated with it. And the photos in each album may have associated tags and attributes as well. These attributes and tags may be used to link the photo albums of different users together.

In particular embodiments, a first photo album created by a first user who has attended an event may include photos taken at the event by the first user. The process illustrated in FIG. 3 may be modified to find one or more second photo albums created by one or more second users, where each second photo album includes photos taken at the same event by a second user who has also attended the event. A set of candidate photo albums may be selected from all the photo albums created by the users of the social-networking website. A score may be determined for each candidate photo album using the attributes and tags of the first photo album and the photos in the first photo album and the attributes and tags of the second photo album and the photos in the second photo album. The candidate photo albums may be ranked based on their respective scores. One or more highest-ranking candidate photo albums may be selected as the one or more second photo albums. In particular embodiments, the selected second photo albums are each considered to include photos relate to the photo in the first photo albums (e.g., photos taken at the same event).

Figure 5:
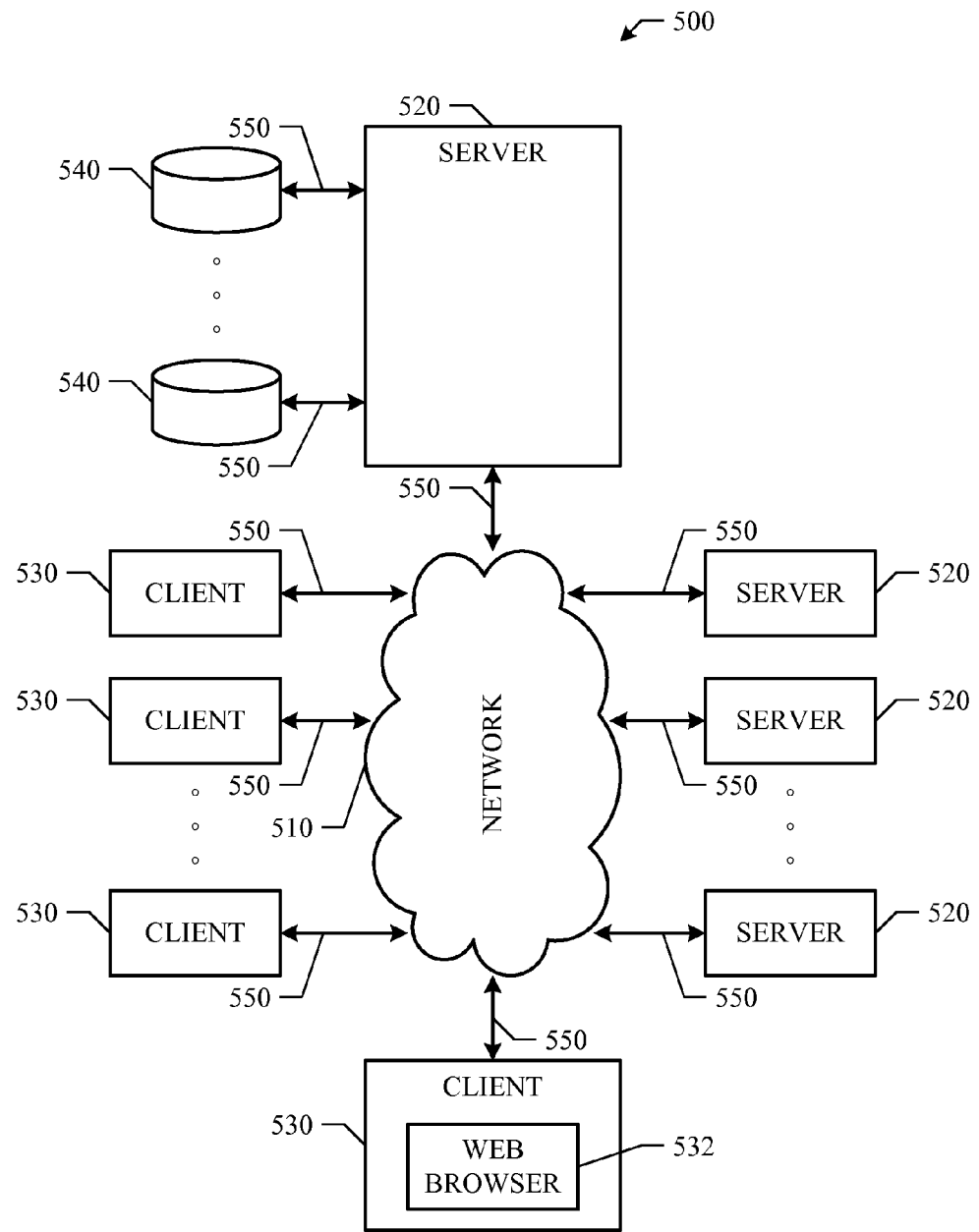
FIG. 5 illustrates an example network environment.

Particular embodiments may be implemented in a network environment. FIG. 5 illustrates an example network environment 500 suitable for providing software validation as a service. Network environment 500 includes a network 510 coupling one or more servers 520 and one or more clients 530 to each other. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wireline, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

In particular embodiments, each client 530 may be a computing device, such as a desktop computer or a work station, or a mobile device, such as a notebook computer, a network computer, or a smart telephone. Each client 530 has network capabilities.

In particular embodiments, a client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 532 may be adapted for the type of client 530 it resides. For example, a web browser residing on a desktop computer may differ (e.g., in functionalities) from a web browser residing on a mobile device. A user of a social networking system may access the website via web browser 532.

Figure 6:
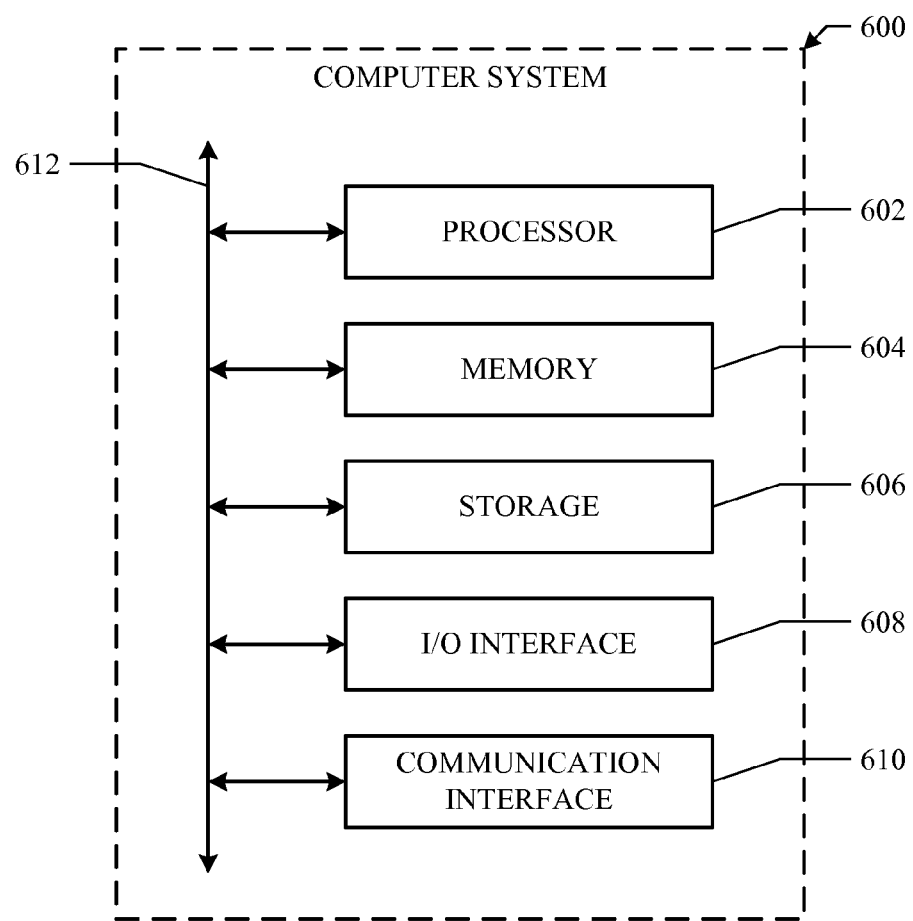
FIG. 6 illustrates an example computer system.

Particular embodiments may be implemented on one or more computer systems. FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory. Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in HyperText Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising:
accessing information about a plurality of actions performed by one or more users of a social networking system, wherein each of the plurality of actions has one or more attributes;
selecting from the plurality of actions a first action and a plurality of second actions, wherein the first action has at least one differing attribute from the plurality of second actions;
computing a score for each second action by comparing the one or more attributes of each second action with the one or more attributes of the first action, wherein computing the score for each second action comprises, for each second action:
comparing one or more attributes of the first action with one or more attributes of the second action, and
adjusting the score of the second action based on one or more matches of the compared attributes of the first and second actions; and
ranking the plurality of second actions according to the score computed for each second action;
selecting a second action, of the plurality of second actions, based on the ranking; and
constructing a news feed using content from the first action and the selected action.

2. The method of claim 1, further comprising:
presenting the news feed to a first user of the social networking system.

3. The method of claim 1, wherein:
the first action is a photo album comprising one or more photos uploaded to the social networking system by a first user of the one or more users of the social networking system; and
the one or more second actions are one or more check-ins transmitted to the social networking system by one or more users.

4. The method of claim 1, wherein:
the first action is a first photo album comprising one or more first photos uploaded to the social networking system by a first user of the one or more users of the social networking system; and
the one or more second actions are one or more second photo albums comprising one or more second photos uploaded to the social networking system by one or more second users, respectively, of the social networking system.

5. The method of claim 1, wherein:
the first action is a photo album comprising one or more photos uploaded to the social networking system by a first user of the one or more users of the social networking system; and
the one or more second actions are one or more events organized through the social networking system.

6. The method of claim 5, wherein:
the one or more attributes of the photo album comprise a title, a location, a time, and one or more persons; and
the one or more attributes of each event comprise a title, a location, a time, one or more invitees, and one or more répondez s'il vous plaît (RSVP) responses.

7. The method of claim 6, wherein,
comparing one or more attributes of the first action with one or more attributes of the second action comprises:
 comparing the title of the photo album and the title of the event, the location of the photo album and the location of the event, and the time of the photo album and the time of the event; and
adjusting the score of the second action based on one or more matches of the compared attributes of the first and second actions comprises:
 adjusting the score of the event depending on a number of keywords in the title of the event that match keywords in the title of the photo album, wherein the score is positively correlated with the number of matched keywords,
 increasing the score of the event if the location of the event matches the location of the photo album,
 decreasing the score of the event if the location of the event does not match the location of the photo album,
 increasing the score of the event if the time of the event matches the time of the photo album, and
 decreasing the score of the event if the time of the event does not match the time of the photo album.

8. The method of claim 6, wherein,
comparing one or more attributes of the first action with one or more attributes of the second action comprises:
 comparing the one or more persons of the photo album and the one or more invitees of the event; and
adjusting the score of the second action based on one or more matches of the compared attributes of the first and second actions comprises:
 increasing the score of the event if a person of the photo album matches an invitee of the event, and
 decreasing the score of the event if a person of the photo album is not an invitee of the event.

9. The method of claim 6, wherein:
the one or more RSVP responses of each event comprise one or more confirmed attending responses, one or more maybe attending responses, and one or more not attending responses; and
comparing one or more attributes of the first action with one or more attributes of the second action comprises:
 comparing the one or more persons of the photo album and the one or more RSVP responses of the event;
adjusting the score of the second action based on one or more matches of the compared attributes of the first and second actions comprises:
 increasing the score of the event if a person of the photo album matches a confirmed attending response or a maybe attending response; and
 decreasing the score of the event if a person of the photo album matches a not attending response.

10. A system, comprising:
a memory comprising instructions executable by one or more processors; and
the one or more processors coupled to the memory and operable to execute the instructions, the one or more processors being operable when executing the instructions to:
 access information about a plurality of actions performed by one or more users of a social networking system, wherein each of the plurality of actions has one or more attributes;
 select from the plurality of actions a first action and a plurality of second actions, wherein the first action has at least one differing attribute from the plurality of second actions;
 compute a score for each second action by comparing the one or more attributes of each second action with the one or more attributes of the first action, wherein computing the score for each second action comprises, for each second action to:
  compare one or more attributes of the first action with one or more attributes of the second action, and
  to adjust the score of the second action based on one or more matches of the compared attributes of the first and second actions; and
 rank the one or more second actions according to the score computed for each second action;
 select a second action, of the plurality of second actions, based on the ranking; and
 construct a news feed using content from the first action and the selected action.

11. One or more non-transitory computer-readable tangible storage media embodying software operable executable by one or more computer systems to perform steps comprising:
accessing information about a plurality of actions performed by one or more users of a social networking system, wherein each of the plurality of actions has one or more attributes;
selecting from the plurality of actions a first action and a plurality of second actions, wherein the first action has at least one differing attribute from the plurality of second actions;
computing a score for each second action by comparing the one or more attributes of each second action with the one or more attributes of the first action, wherein computing the score for each second action comprises, for each second action:
 comparing one or more attributes of the first action with one or more attributes of the second action, and
 adjusting the score of the second action based on one or more matches of the compared attributes of the first and second actions; and
ranking the plurality of second actions according to the score computed for each second action;
selecting a second action, of the plurality of second actions, based on the ranking; and
constructing a news feed using content from the first action and the selected action.

12. The media of claim 11, further comprising:
presenting the news feed to a first user of the social networking system.

13. The media of claim 11, wherein:
the first action is a photo album comprising one or more photos uploaded to the social networking system by a first user of the one or more users of the social networking system; and
the one or more second actions are one or more check-ins transmitted to the social networking system by one or more users.

14. The media of claim 11, wherein:
the first action is a first photo album comprising one or more first photos uploaded to the social networking system by a first user of the one or more users of the social networking system; and
the one or more second actions are one or more second photo albums comprising one or more second photos uploaded to the social networking system by one or more second users, respectively, of the social networking system.

15. The media of claim 11, wherein:
the first action is a photo album comprising one or more photos uploaded to the social networking system by a first user of the one or more users of the social networking system; and
the one or more second actions are one or more events organized through the social networking system.

16. The media of claim 15, wherein:
the one or more attributes of the photo album comprise a title, a location, a time, and one or more persons; and
the one or more attributes of each event comprise a title, a location, a time, one or more invitees, and one or more répondez s'il vous plait (RSVP) responses.

17. The media of claim 16, wherein,
comparing one or more attributes of the first action with one or more attributes of the second action comprises:
comparing the title of the photo album and the title of the event, the location of the photo album and the location of the event, and the time of the photo album and the time of the event; and
adjusting the score of the second action based on one or more matches of the compared attributes of the first and second actions comprises:
adjusting the score of the event depending on a number of keywords in the title of the event that match keywords in the title of the photo album, wherein the score is positively correlated with the number of matched keywords;
increasing the score of the event if the location of the event matches the location of the photo album;
decreasing the score of the event if the location of the event does not match the location of the photo album;
increasing the score of the event if the time of the event matches the time of the photo album; and
decreasing the score of the event if the time of the event does not match the time of the photo album.

18. The media of claim 16, wherein,
comparing one or more attributes of the first action with one or more attributes of the second action comprises:
comparing the one or more persons of the photo album and the one or more invitees of the event; and
adjusting the score of the second action based on one or more matches of the compared attributes of the first and second actions comprises:
increasing the score of the event if a person of the photo album matches an invitee of the event; and
decreasing the score of the event if a person of the photo album is not an invitee of the event.

19. The media of claim 16, wherein:
the one or more RSVP responses of each event comprise one or more confirmed attending responses, one or more maybe attending responses, and one or more not attending responses; and
the one or more RSVP responses of each event comprise one or more confirmed attending responses, one or more maybe attending responses, and one or more not attending responses; and
comparing one or more attributes of the first action with one or more attributes of the second action comprises:
comparing the one or more persons of the photo album and the one or more RSVP responses of the event;
adjusting the score of the second action based on one or more matches of the compared attributes of the first and second actions comprises:
increasing the score of the event if a person of the photo album matches a confirmed attending response or a maybe attending response; and
decreasing the score of the event if a person of the photo album matches a not attending response.

* * * * *